(12) United States Patent
Tønnessen et al.

(10) Patent No.: US 10,222,499 B2
(45) Date of Patent: Mar. 5, 2019

(54) SYSTEM AND METHOD OF MARINE GEOPHYSICAL SURVEYS WITH DISTRIBUTED SEISMIC SOURCES

(71) Applicant: PGS Geophysical AS, Oslo (NO)

(72) Inventors: Rune Tønnessen, Oslo (NO); Mattias D. C. Oscarsson, Oslo (NO)

(73) Assignee: PGS Geophysical AS, Oslo (NO)

( * ) Notice: Subject to any disclaimer, the term of this patent is extended or adjusted under 35 U.S.C. 154(b) by 110 days.

(21) Appl. No.: 15/366,641

(22) Filed: Dec. 1, 2016

(65) Prior Publication Data

US 2017/0199292 A1    Jul. 13, 2017

Related U.S. Application Data

(60) Provisional application No. 62/277,128, filed on Jan. 11, 2016.

(51) Int. Cl.
    *G01V 1/38* (2006.01)
    *G01V 1/04* (2006.01)

(52) U.S. Cl.
    CPC .............. *G01V 1/3808* (2013.01); *G01V 1/04* (2013.01); *G01V 1/3861* (2013.01)

(58) Field of Classification Search
    CPC ....... G01V 1/3808; G01V 1/3861; G01V 1/04
    See application file for complete search history.

(56) References Cited

U.S. PATENT DOCUMENTS

| 5,142,498 | A | 8/1992 | Duren |
| 5,913,280 | A | 6/1999 | Nielsen et al. |
| 5,995,452 | A * | 11/1999 | Bouyoucus ............. G01S 7/524 181/111 |
| 6,028,817 | A | 2/2000 | Ambs |
| 6,606,958 | B1 | 8/2003 | Bouyoucos |
| 6,942,059 | B2 | 9/2005 | Smith |
| 7,203,130 | B1 | 4/2007 | Welker |
| 7,376,045 | B2 | 5/2008 | Falkenberg et al. |

(Continued)

FOREIGN PATENT DOCUMENTS

| AU | 2003207039 B9 | 2/2004 |
| AU | 2004203132 B2 | 2/2005 |

(Continued)

OTHER PUBLICATIONS

Tippee, Bob; "Broadband acquisition, processing improving marine seismic surveys", Oil&Gas Journal, Nov. 5, 2012.

(Continued)

*Primary Examiner* — Ian J Lobo

(57) ABSTRACT

Marine geophysical surveys with distributed seismic sources. At least some of the example embodiments are methods including performing a marine geophysical survey by: towing a plurality of high-frequency sources spread along a width of an array of sensors, the high-frequency sources having a first source density with respect to the width; and towing a plurality of mid-frequency sources spread along the width, the mid-frequency sources have a second source density with respect to the width, the second source density lower than the first source density; and towing a low-frequency source along the width; activating the high-frequency, mid-frequency, and low-frequency sources.

27 Claims, 9 Drawing Sheets

(56) References Cited

U.S. PATENT DOCUMENTS

| | | | |
|---|---|---|---|
| 7,391,673 B2 | 6/2008 | Regone et al. | |
| 7,518,951 B2 | 4/2009 | Solheim et al. | |
| 7,551,518 B1 | 6/2009 | Tenghamn | |
| 7,701,803 B2 | 4/2010 | Welker | |
| 7,805,249 B2 | 9/2010 | Summerfield et al. | |
| 7,859,945 B2 | 12/2010 | Sallas et al. | |
| 7,881,158 B2 | 2/2011 | Tenghamn | |
| 7,974,152 B2 | 7/2011 | Tenghamn | |
| 8,094,514 B2 | 1/2012 | Tenghamn | |
| 8,102,731 B2 * | 1/2012 | Cambois | G01V 1/38 367/15 |
| 8,335,127 B2 | 12/2012 | Tenghamn | |
| 8,427,901 B2 | 4/2013 | Lunde et al. | |
| 8,565,041 B2 * | 10/2013 | Ruet | G01V 1/3861 367/23 |
| 8,588,025 B2 | 11/2013 | Moldoveanu et al. | |
| 8,724,426 B2 | 5/2014 | Welker | |
| 8,730,760 B2 | 5/2014 | Cambois et al. | |
| 8,824,239 B2 | 9/2014 | Welker et al. | |
| 8,830,786 B1 | 9/2014 | Elvestad | |
| 8,976,622 B2 | 3/2015 | Hillesund et al. | |
| 8,976,623 B2 | 3/2015 | Sudow et al. | |
| 9,025,417 B2 | 5/2015 | Hopperstad et al. | |
| 9,103,943 B2 | 8/2015 | Cowlard et al. | |
| 9,134,442 B2 | 9/2015 | Dellinger et al. | |
| 9,151,859 B2 | 10/2015 | Martin | |
| 9,158,019 B2 | 10/2015 | Bagaini | |
| 9,207,349 B2 | 12/2015 | Cambois | |
| 9,213,119 B2 | 12/2015 | Eick et al. | |
| 9,217,806 B2 | 12/2015 | Peppe et al. | |
| 9,234,977 B2 | 1/2016 | Ferber et al. | |
| 9,250,345 B2 | 2/2016 | Mattsson | |
| 9,341,725 B2 | 5/2016 | Tenghamn | |
| 9,360,574 B2 | 6/2016 | Tenghamn et al. | |
| 9,389,327 B2 | 7/2016 | Kroling | |
| 9,720,120 B2 | 8/2017 | Leveille et al. | |
| 2007/0223306 A1 | 9/2007 | Toennessen | |
| 2010/0118646 A1 | 5/2010 | Tenghamn | |
| 2010/0118647 A1 | 5/2010 | Tenghamn | |
| 2010/0302900 A1 | 12/2010 | Tenghamn | |
| 2010/0322028 A1 | 12/2010 | Tenghamn | |
| 2011/0007603 A1 | 1/2011 | Frivik et al. | |
| 2011/0158045 A1 | 6/2011 | Karlson et al. | |
| 2011/0199857 A1 | 8/2011 | Garden | |
| 2012/0147699 A1 | 6/2012 | Dellinger et al. | |
| 2013/0333974 A1 | 12/2013 | Coste et al. | |
| 2013/0336087 A1 | 12/2013 | Laws | |
| 2014/0016435 A1 | 1/2014 | Ruet | |
| 2014/0112097 A1 | 4/2014 | Dowle et al. | |
| 2014/0140169 A1 | 5/2014 | Cambois | |
| 2014/0226439 A1 | 8/2014 | Tenghamn | |
| 2014/0241117 A1 | 8/2014 | Dellinger et al. | |
| 2014/0241123 A1 | 8/2014 | Sallas et al. | |
| 2014/0262595 A1 | 9/2014 | Elvestad | |
| 2014/0269173 A1 | 9/2014 | Coste et al. | |
| 2014/0269176 A1 | 9/2014 | Mattsson | |
| 2014/0278116 A1 | 9/2014 | Halliday et al. | |
| 2014/0297190 A1 | 10/2014 | Svay et al. | |
| 2014/0334259 A1 | 11/2014 | Tenghamn | |
| 2014/0340985 A1 | 11/2014 | Tenghamn | |
| 2014/0376330 A1 | 12/2014 | Howieson et al. | |
| 2015/0085605 A1 | 3/2015 | Tenghamn | |
| 2015/0085606 A1 | 3/2015 | Tenghamn et al. | |
| 2015/0085607 A1 | 3/2015 | Tenghamn | |
| 2015/0085608 A1 | 3/2015 | Tenghamn et al. | |
| 2015/0185341 A1 | 7/2015 | Ryttersson | |
| 2015/0346365 A1 | 12/2015 | Desrues | |
| 2015/0362612 A1 | 12/2015 | Oscarsson | |
| 2015/0369627 A1 | 12/2015 | Oscarsson et al. | |
| 2016/0047923 A1 | 2/2016 | Kroling | |
| 2016/0054465 A1 | 2/2016 | Lamont et al. | |
| 2016/0061973 A1 | 3/2016 | Orji et al. | |
| 2016/0109599 A1 | 4/2016 | Kroling | |
| 2016/0202365 A1 | 7/2016 | Engdahl et al. | |
| 2016/0259072 A1 | 9/2016 | Tenghamn | |
| 2016/0259073 A1 | 9/2016 | Tenghamn | |
| 2016/0259074 A1 | 9/2016 | Tenghamn et al. | |
| 2016/0306057 A1 | 10/2016 | Kroling | |
| 2016/0327662 A1 | 11/2016 | Bernhardsson et al. | |
| 2016/0327663 A1 | 11/2016 | Bernhardsson et al. | |
| 2016/0327665 A1 | 11/2016 | Bernhardsson et al. | |
| 2017/0363760 A1 * | 12/2017 | Mensch | G01V 1/3808 |

FOREIGN PATENT DOCUMENTS

| | | |
|---|---|---|
| EP | 0018053 A1 | 10/1980 |
| WO | 2014133509 A1 | 9/2014 |
| WO | 2015036554 | 3/2015 |
| WO | 2015136378 | 9/2015 |
| WO | 2015147965 A2 | 10/2015 |
| WO | 2016/076953 A1 | 5/2016 |

OTHER PUBLICATIONS

International Search Report and Written Opinion for International Application No. PCT/2016/079880 dated Mar. 23, 2017; 16 pages.

International Search Report and Written Opinion for International Application No. PCT/EP2017/050429 dated Mar. 16, 2017; 13 pages.

Lambert, Dale, "Seismic Acquisition: Marine seismic survey positioning and control requirements evolve," Offshore Magazine, vol. 63, Issue 3, Mar. 1, 2003.

Musser, James A., "Streamer Positioning and Spread Stabilization for 4D Seismic," Society of Exploration Geophysicists, 2006.

International Association of Oil & Gas Producers, "An Overview of Marine Seismic Operations," Report No. 448, Apr. 2011.

Panigrahi, S., "Offshore Seismic Data Acquisition," Power Point Presentation.

Petroleum Geo-Services, "Acquisition Technology Snapshots," Tech Link, vol. 9, No. 12, Dec. 2009.

* cited by examiner

SYSTEM AND METHOD OF MARINE GEOPHYSICAL SURVEYS WITH DISTRIBUTED SEISMIC SOURCES

CROSS-REFERENCE TO RELATED APPLICATIONS

This application claims the benefit of U.S. Provisional Application Ser. No. 62/277,128 filed Jan. 11, 2016 and titled "Distributed Seismic Source System." The provisional application is incorporated by reference herein as if reproduced in full below.

BACKGROUND

Geophysical surveying (e.g., seismic, electromagnetic) is a technique where two- or three-dimensional "pictures" of the state of an underground formation are taken. Geophysical surveying takes place not only on land, but also in marine environments (e.g., oceans, large lakes). Marine geophysical surveying systems frequently use a plurality of streamers which contain sensors to detect energy reflected from underground formations below the water bottom. Seismic streamers include sensors for detecting seismic signals reflected from underground formations below the water bottom, including formations containing hydrocarbon deposits.

BRIEF DESCRIPTION OF THE DRAWINGS

For a detailed description of exemplary embodiments, reference will now be made to the accompanying drawings in which.

DEFINITIONS

Figure 1A:
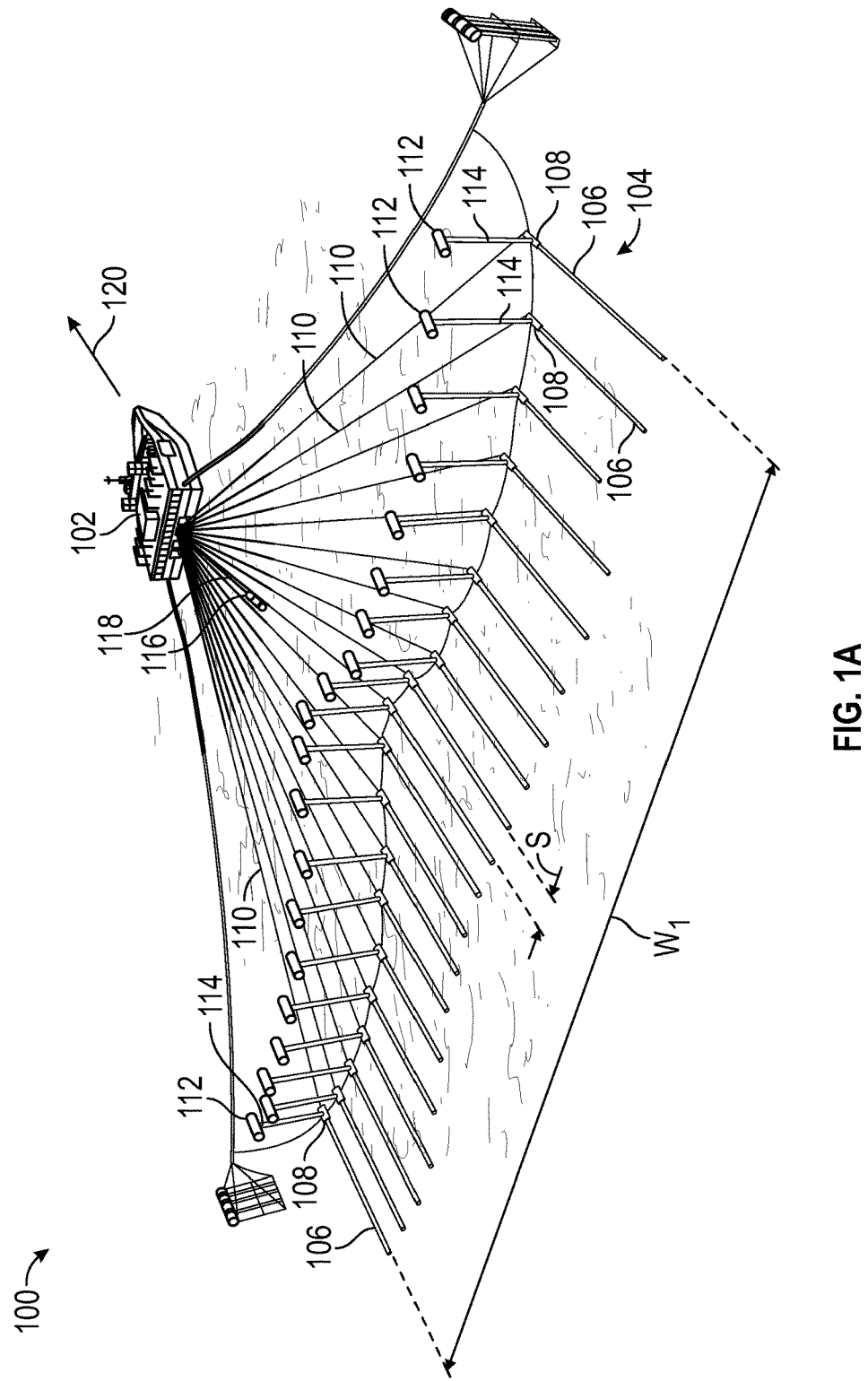
FIG. 1A shows a perspective view of marine geophysical survey system.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

"High-frequency source" shall mean a seismic source (whether an individual source, an array of sources, or multiple arrays of sources) that produces seismic energy within a frequency band having a highest frequency component. Wide-band sources, such as air-guns and explosive charges, which produce seismic energy effectively across all frequency bands shall not be considered a "high-frequency source" for purposes of this disclosure and claims.

"Mid-frequency source" shall mean a seismic source (whether an individual source, an array of sources, or multiple arrays of sources) that produces seismic energy within a frequency band and having a highest frequency component lower than the highest frequency component of a high-frequency source. Wide-band sources, such as air-guns and explosive charges, which produce seismic energy effectively across all frequency bands shall not be considered a "mid-frequency source" for purposes of this disclosure and claims.

"Low-frequency source" shall mean a seismic source (whether an individual source, an array of sources, or multiple arrays of sources) that produces seismic energy within a frequency band and having a highest frequency component lower than the highest frequency component of both a high-frequency source and mid-frequency source. Wide-band sources, such as air-guns and explosive charges, which produce seismic energy effectively across all frequency bands shall not be considered a "low-frequency source" for purposes of this disclosure and claims.

"Bender" shall mean a marine seismic source having two oppositely arranged plates that, upon application of energy to a displacement system, flex inwardly toward each other and outwardly away from each other, and thus displace water creating seismic energy. The displacement system may be electrically, hydraulically, or electro-mechanically driven.

"Effective bender area" for a seismic source shall mean a value proportional to the product of the bender diameter for the seismic source, the number of benders comprising the seismic source, and the bender dynamic displacement of each bender of the seismic source.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to marine geophysical survey systems using distributed seismic sources to increase common midpoint width, and thus effective width of a seismic survey. More particularly, in some example systems the seismic sources are divided into at least a plurality of high-frequency sources, a plurality of mid-frequency sources, and one or more low-frequency sources. The high-frequency sources are spread along a width of an array of sensors, such as in a towed streamer spread, or sensors of a permanent reservoir monitoring (PRM) system. The high-frequency sources define a first source density, the first source density being the highest source density. The mid-frequency sources are also spread along the width and define a second source density lower than the first source density. The one or more low-frequency sources define a third source density along the width of the streamer spread, the third source density being the lowest source density, and in some cases a single low-frequency source is towed directly behind the tow vessel. The specification first turns to an example related-art system to orient the reader.

FIG. 1A shows a perspective view of a geophysical survey system 100. In particular, the geophysical survey system of FIG. 1 has a tow vessel 102 towing a streamer spread 104. The example streamer spread 104 comprises a plurality of sensor streamers 106, where each sensor streamer has a plurality of receivers or sensors (not specifically shown) spaced along the sensor streamer. The sensor streamers 106 are each coupled, at the ends nearest the tow vessel 102, to respective lead-in cable terminations 108. The lead-in cable terminations 108 are coupled to or are associated with the spreader lines (not specifically numbered) so as to control the lateral positions of the sensor streamers 106 with respect to each other and with respect to the tow vessel 102. Towing force for the sensor streamers 106, as well as communicative connections between the components in the recording system on the tow vessel and the sensors, is provided by the tow vessel 102 by way of lead-in cables 110. Each sensor streamer may also have an associated lead buoy 112 coupled to the proximal end of the respective sensor streamer by way of respective lines 114. The lead buoys 112 not only mark the proximal end of the sensor streamers, but in some cases also provide depth control for the proximal end of the sensor streamers 106.

The example system of FIG. 1A also comprises a seismic source 116. The seismic source 116 is towed by dedicated tow cable 118 coupled between the seismic source 118 and the tow vessel 102. The tow cable 118 that pulls the seismic source 116 may include an umbilical with tubing to provide compressed air to the seismic source (e.g., air at 2000 pounds per square inch gauge (psig)) in addition to electrical power and communicative pathways. The tow cable for the seismic source 116 is sometimes referred to as "gun umbilical cable." Because of the various components, the tow cable 118 for the seismic source 116 may have significantly greater diameter than, for example, lead-in cables 110, and thus towing force for the tow cable 118 is higher than for an equivalent length of lead-in cable 110. In some cases, the tow cable 118 may have a diameter on the order of 80 millimeters (mm) or more, while lead-in cables may be on the order of about 30 mm.

The streamer spread 104 may include many sensor streamers 106, and in the example system shown the streamer spread 104 includes 20 sensor streamers 106 (and related lead-in cables 110 and lead buoys 112). In many cases the spacing S between adjacent sensor streamers 106 may be between 25 and 200 meters, usually about 100 meters (measured perpendicular to the sail line 120 of the tow vessel), and thus for the example streamer spread 104 having 20 sensor streamers the overall width W1 (again measured perpendicular to the sail line 120) may be about two kilometers.

While FIG. 1A shows the seismic source 116 as a single entity, in many cases the seismic source 116 is made of two or more separately towed source arrays. Each source array may comprise three sub-arrays towed in series, in some cases about eight meters apart. The separation between the outer-most source arrays may be about 50 meters; nevertheless, the separation between the source arrays is relatively small in comparison to the separation S between the sensor streamers 106 and the overall width W1 of the streamer spread 104. Because of the scale of the separation between source arrays compared to the scale of the separation S between the sensor streamers, for many cases the seismic source 116 resides between the innermost sensor streamers, but the positioning of the seismic source 116 is not so far back as to tangle with the lead buoys 112 and lines 114 for the innermost sensor streamers 106.

The position of a seismic source 116 towed directly by the tow vessel 102 in combination with streamer spreads having a large width W1 creates issues in geophysical surveys, particularly in shallow water and for relatively shallow underground reflectors. In particular, and still referring to FIG. 1A, the source-receiver offset between the seismic source 116 and receivers (not specifically shown) on the innermost sensor streamers 106 is relatively short (e.g., 100 to 300 meters); however, the source-receiver offset between the seismic source 116 and the receivers on the outermost sensor streamers is significant. For the example system of FIG. 1A with 100 meter separation S between the sensor streamers 106, the source-receiver offset for the outermost sensor streamers may be on the order of about 1 kilometer for the closest sensors. However, for shallow underground reflectors in shallow water the largest usable near source-receiver offset may be about 500 meters, and thus the outer sensor streamers may be unusable. It follows that the recorded data may contain swaths of unusable or missing data between the sail lines for shallow water and shallow underground reflectors.

Figure 1B:
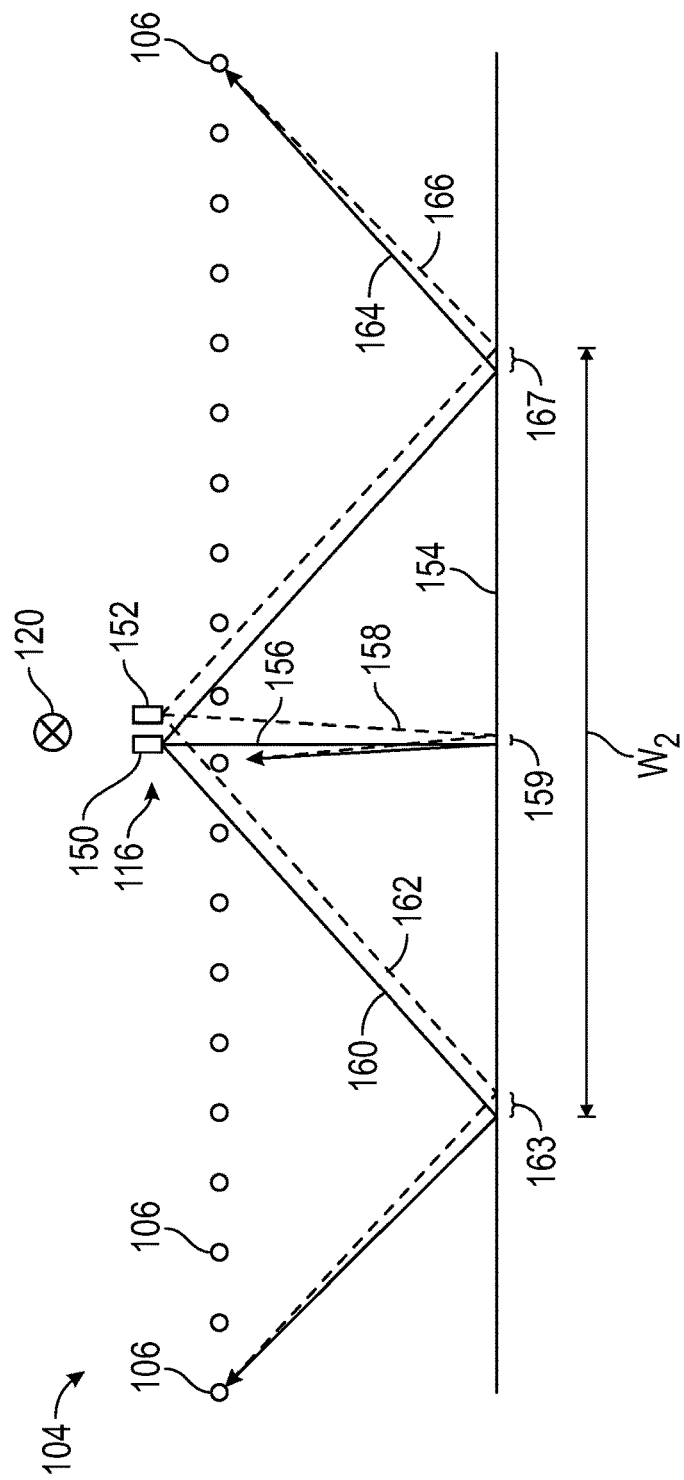
FIG. 1B shows an end elevation view of a marine geophysical survey system.

FIG. 1B shows a simplified elevation view of the system of FIG. 1A looking along the sail line 120 from behind the streamer spread. In particular, FIG. 1B shows a plurality of sensor streamers 106, along with seismic source 116 in the form of two sub-arrays 150 and 152 centered within the streamer spread 104. A seismic reflector 154 is represented by a horizontal line, and the seismic reflector could be, for example, the ocean bottom or an underground formation. In the case of FIG. 1B, and for purposes of description, the seismic source 116 is a broad-band source (e.g., a plurality of air guns, explosive charges) that, when activated, create seismic energy spanning all the frequency range of interest (e.g., between 0 to above 120 Hertz). The seismic energy propagates outward from each sub array 150 and 152 in wave fronts, reflects from various seismic reflectors (e.g., ocean bottom, underground formation), and propagates back toward receivers (not specifically shown) in the sensor streamers 106. The wave fronts of seismic energy are not shown in FIG. 1B so as not to unduly complicate the figure, but the direction of travel of the wave fronts with respect the sub arrays 150 and 152 and several of the sensor streamers is shown by lines. In particular, solid line 156 shows a path of travel of seismic energy released from the sub array 150, reflected from the seismic reflector 154, and then incident upon the left sensor streamer of the two inner-most sensor streamers 106. Likewise dashed line 158 shows a path of travel of seismic energy released from the sub array 152, reflected from the seismic reflector 154, and then incident upon the left sensor streamer of the two inner-most sensor streamers 106. Thus, the location where lines 156 and 158 reflect represent a common mid-point (CMP) 159 between the sub arrays 150 and 152 and the left inner-most sensor streamer. The figure shows the CMP 159 as the same so as not to unduly complicate the figure; however, in some cases the CMP between each sub array 150 and 152 are considered different for later processing, thus doubling the number of CMPs within the survey.

For the left outermost streamer 106 solid line 160 and dashed line 162 show the path of travel of seismic energy released from the respective sub arrays 150 and 152, reflected from the seismic reflector 154 at the CMP 163, and then incident upon the left outmost streamer 106. So as not to unduly complicate the figure the CMPs for the differing sub arrays 150 and 152 are both designated as CMP 163, but in practice the midpoints may be considered distinct. Similarly for the right outermost streamer 106, solid line 164 and dashed line 166 show the path of travel of seismic energy released from the respective sub arrays 150 and 152, reflected from the seismic reflector 154 at the CMP 167, and then incident upon the right outmost streamer 106. Again, so as not to unduly complicate the figure the CMPs for the differing sub arrays 150 and 152 are both designated as CMP 167, but in practice the midpoints may be considered distinct. The CMPs 163 and 167 represent a width W2 shown in FIG. 1B, and it will be understood that for portions of the seismic reflector 154 residing outside the width W2, the reflected energy does not intersect the streamers in the example situation shown.

Geophysical surveys using the systems of FIGS. 1A and 1B have certain shortcomings. In particular, seismic energy is attenuated as a function of distance propagated, and higher frequency seismic energy is attenuated more quickly than lower frequency seismic energy, particularly in water. Thus, as streamer spreads continue to get larger in an attempt to increase survey efficiency, seismic signal levels at the outermost sensor streamers 106 tend to degrade, particularly at the higher frequencies. Moreover, and as shown in FIG. 1B, even though the streamer spread 104 may have a large width, for seismic sources towed directly behind the tow vessel the largest CMP width W2 is still about half the streamer width W1, which issue is magnified for geophysical surveys in shallow water or for shallow underground reflectors.

The issues noted above are addressed, in large part, by a new geophysical surveying system (and related methods) that distributes seismic sources to increase common mid-point width, and thus effective width of a seismic survey. More particularly, in some example systems the seismic sources are divided into at least a plurality of high-frequency sources, a plurality of mid-frequency sources, and one or more low-frequency sources. The high-frequency sources are spread along a width of an array of sensors (such as sensors of a streamer spread) and define a first source density, the first source density being the highest source density. The mid-frequency sources are also spread along the width and define second source density lower than the first source density. The one or more low-frequency sources define a third source density along the width, the third source density being the lowest source density, and in some cases a single low-frequency source is towed directly behind the tow vessel. The specification continues with the assumption that there are three frequency divisions; however, two or more frequency divisions (and thus distinct source types) are possible, such as four divisions and thus four source types.

Figure 2:
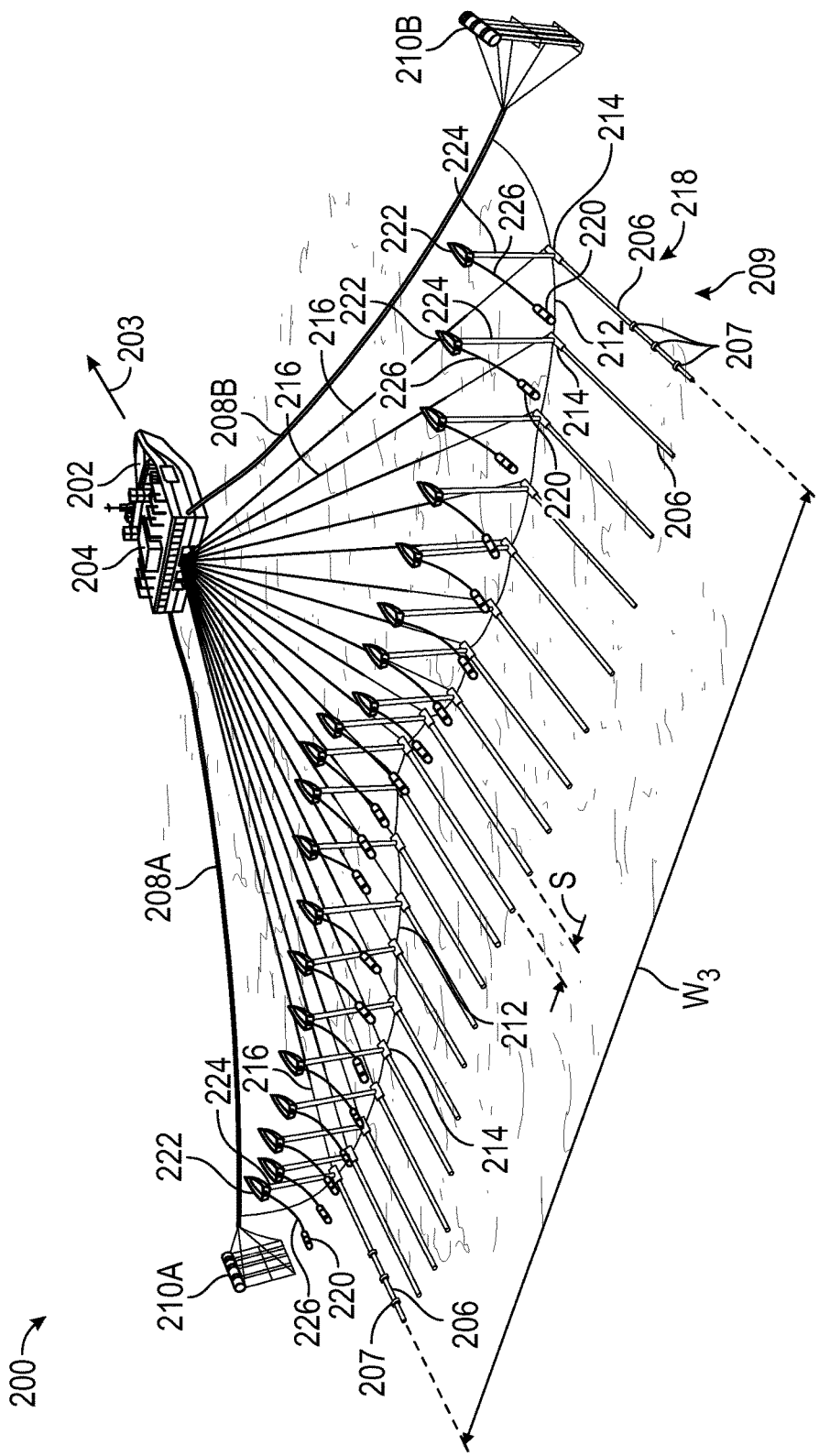
FIG. 2 shows a perspective view of marine geophysical survey system in accordance with at least some embodiments.

FIG. 2 shows a perspective view of a geophysical survey system 200 in accordance with example embodiments. In particular, FIG. 2 shows a tow vessel 202 having onboard equipment 204, such as navigation, energy source control, and data recording equipment. Tow vessel 202 is configured to tow a plurality of sensor streamers 206 through the water, with the path of the tow vessel 202 referred to as a sail line 203. While FIG. 2 illustratively shows 20 sensor streamers 206, greater or fewer sensor streamers may be used. Each sensor streamer 206 has a plurality of sensors 207 (only a few example sensors 207 shown on the outermost sensor streamers 206, but each sensor streamer will have many hundreds or thousands of sensors along their respective lengths). The sensors from all the sensor streamers considered together form an array of sensors 209.

The example sensor streamers 206 are coupled to towing equipment that maintains the sensor streamers 206 at selected lateral positions with respect to each other and with respect to the tow vessel 202. The towing equipment may comprise two paravane tow lines 208A and 208B each coupled to the tow vessel 202 by way of winches (not specifically shown). The winches enable changing the deployed length of each paravane tow line 208A and 208B. The second end of paravane tow line 208A is coupled to a paravane 210A, and the second end of paravane tow line 208B is coupled to paravane 210B (the paravanes are sometimes referred to as "doors."). In each case, the paravane tow lines 208A and 208B couple to their respective paravanes through respective sets of lines called a "bridle" (shown but not specifically numbered). The paravanes 210A and 210B are each configured to provide a lateral force component to the various elements of the survey system when the paravanes are towed through the water. The combined lateral forces of the paravanes 210A and 210B separate the paravanes from each other until the paravanes put one or more spreader lines 212, coupled between the paravanes 210A and 210B, into tension.

The sensor streamers 206 are each coupled at the ends nearest the tow vessel 202 (i.e., the "proximal ends") to a respective lead-in cable termination 214. The lead-in cable terminations 214 are coupled to or are associated with the spreader lines 212 so as to control the lateral positions of the sensor streamers 206 with respect to each other and with respect to the tow vessel 202. Electrical and/or optical connections between the appropriate components in the onboard equipment 204 and the sensors (not specifically shown) in the sensor streamers 206 may be made using inner lead-in cables 216. Moreover, each lead-in cable 216 provides towing force for its respective sensor streamer 206 as the tow vessel 202 tows the streamer spread 218 during a geophysical survey. Much like the tow lines 208A and 208B associated with paravanes 210A and 210B, each of the lead-in cables 216 may be deployed by a respective winch or similar spooling device (not specifically shown) such that the deployed length of each lead-in cable 216 can be changed, such as during turns of the tow vessel 202.

The length of each sensor streamer 206 is fixed for a particular geophysical survey, but the length of the sensor streamer may range from as short as a few thousand meters, to lengths of 10,000 meters or more in other cases. In many cases, the spacing S between adjacent sensor streamers 206 may be between and including 25 to 200 meters, in many cases about 100 meters (measured perpendicular to the sail line 203 of the vessel), and thus for the example streamer spread 218 having 20 sensor streamers 206 the overall width W3 (again measured perpendicularly to the sail line 203) may be about 1900 meters.

In various embodiments discussed herein, each sensor (such as sensors in the streamers 206) may comprise sensors in the form of a plurality of hydrophone-velocity sensor pairs spaced along the sensor streamer. That is, each sensor may comprise a hydrophone and co-located velocity sensor. A hydrophone is a device which creates an output signal (e.g., electrical, optical) proportional to pressure sensed by the hydrophone, and more particularly to changes in pressure proximate the hydrophone as acoustic energy travels past the hydrophone. A velocity sensor shall mean a device which senses particle motion, and produces an output signal (e.g., electrical, optical) responsive to small movements, velocity, and/or acceleration as acoustic energy travels past the sensor. Thus, the velocity sensor may be an accelerometer, and can be implemented in any suitable form, such as piezoelectric accelerometers, micro electro-mechanical system (MEMS) accelerometers, and so on. In most cases the hydrophone and velocity sensor of a pair are within a few centimeters of each other (e.g., 10 centimeters), but closer spacing and longer spacing is also contemplated. In some cases, the velocity sensor is responsive only to movements/acceleration in the vertical direction (e.g., a z-component sensor); however, in other cases the sensor may be sensitive in all major axes. In yet still other cases, the velocity sensors may be omitted and only hydrophones may be used. In some cases, a plurality of hydrophones may be wired together in groups such that the group of hydrophones represents one channel in the recording system.

The sensors of the example sensor streamer detect seismic energy reflected from underground reflectors (such as interfaces between rock formations having different acoustic properties). Unlike the situation of FIGS. 1A and 1B where the seismic source 116 (possibly in the form of sub arrays 150/152) is towed directly by the tow vessel 102 between the two innermost sensor streamers 106, in accordance with example systems the seismic sources are distributed across the array of sensors (in this case the streamer spread 218) and, as discussed more below, the seismic sources are divided into high-frequency sources, mid-frequency sources, and low-frequency sources. In the example system of FIG. 2, each sensor streamer has an associated seismic source 220 pulled by a lead vessel 222 (other arrangements are discussed below). In particular, each sensor streamer 206 has associated therewith a lead vessel 222 floating at or near surface of the body of water. In the example system of FIG. 2 the lead vessel 222 is coupled to the proximal end of its associated sensor streamer 206 by way of a tow cable 224 that extends between the proximal end of the sensor streamer 206 (in some cases the lead-in cable termination 214) and the lead vessel 222. The seismic source 220 is in the water behind the lead vessel 222, with the seismic source 220 coupled to the lead vessel by a source cable 226 that extends from the lead vessel 222 to the seismic source 220.

Unlike the systems of FIGS. 1A and 1B where the sole seismic source 116 for the streamer spread 104 is towed directly behind the tow vessel 102 by a tow cable 118 in the form of one or more gun umbilical cables, in the example system of FIG. 2 each seismic source 220 is pulled by a lead vessel 222. The lead vessel 222 is pulled by the tow cable 224 and the respective lead-in cable 216. In alternate embodiments, not specifically shown, the seismic sources 220 may be towed in any suitable manner, such as having the source cables towed from the paravane tow lines 208A and 208B, or dedicated doors and tow cables coupled directly to the tow vessel 202. The embodiments of FIG. 2 are presented only as an example of distributing the seismic sources 220 across the width of the array of sensors 209, and not as a limitation on the towing techniques used to distribute the seismic sources.

Figure 3:
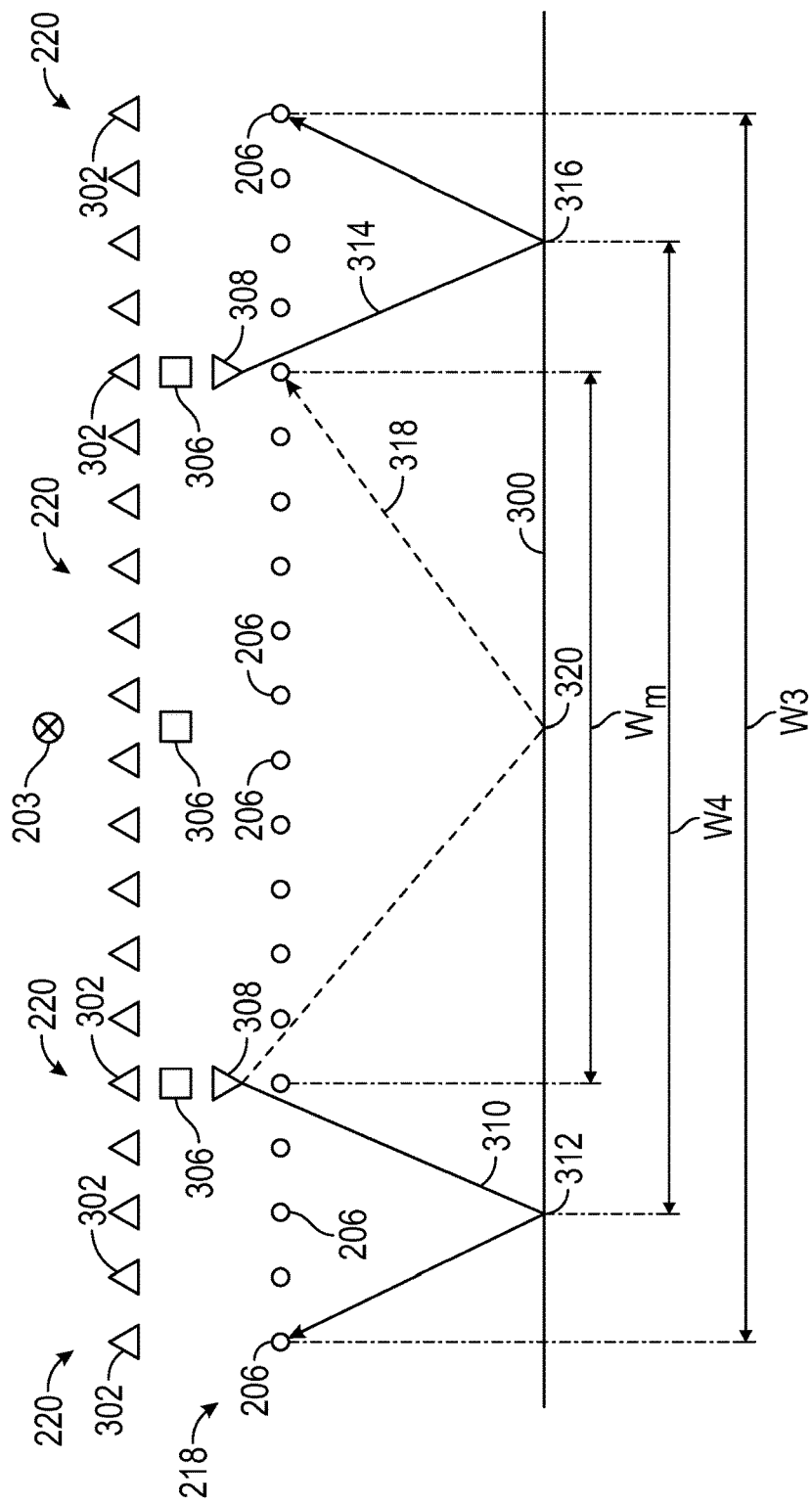
FIG. 3 shows an end elevation view of the marine geophysical survey system of FIG. 2 in accordance with at least some embodiments.

FIG. 3 shows a simplified elevation view of the system of FIG. 2 looking along the sail line 203 from behind the streamer spread. In particular, FIG. 3 shows the streamer spread 218 comprising a plurality of sensor streamers 206. A seismic reflector 300 is represented by a horizontal line, and the seismic reflector could be, for example, the ocean bottom or an underground formation. In accordance with example embodiments, the seismic sources 220 are distributed across the width W3 of the streamer spread 218. In addition, the seismic sources are divided into a plurality of high-frequency sources 302 (shown with upward pointing triangles, and not all high-frequency sources are numbered), a plurality of mid-frequency sources 306 (shown with squares), and a plurality of low low-frequency sources 308 (shown with downward pointing triangles). Thus, in cases where only a high-frequency source 302 is present at a particular location, in the example system the lead vessel 222 (not shown in FIG. 3) pulls only the high-frequency source 302. In cases where two or more sources are co-located (e.g., as shown a high-frequency source 302, mid-frequency source 306, and low-frequency source 308), the associated lead vessel 222 (not shown in FIG. 3) pulls all three sources. In the example embodiment of FIG. 3, the mid-frequency source 306 centered in the streamer spread 218 may be towed directly by the tow vessel 202 (not shown in FIG. 3).

The high-frequency sources are spread along a width W3 of the streamer spread 218, and in fact the example tow width of the high-frequency sources 302 is W3. Moreover, the high-frequency sources define a first source density. In the example case, there are twenty high-frequency sources 302, and thus the source density may be the number of the high-frequency sources 302 with respect to the width W3. Given that the streamers 206 are also distributed about the width W3, an alternate indication of source density for the high-frequency sources may be the number of the high-frequency sources with respect to the number of sensor streamers 206, in this case resulting in a 20:20 (or reduced 1:1) source density for the high-frequency sources 302.

The mid-frequency sources are also spread along the width W3 of the streamer spread 218, and in the example case the tow-width of the mid-frequency sources is Wm, less than W3. Moreover, the mid-frequency sources define a second source density. In the example case, there are three mid-frequency sources 304, and thus the source density may be the number of the mid-frequency sources 302 with respect to the width W3. Given that the streamers 206 are also distributed about the width W3, an alternate indication of source density for the mid-frequency sources may be the number of the mid-frequency sources with respect to the number of sensor streamers 206, in this case resulting in a 3:20 source density for the mid-frequency sources 304. As seen, for the example system the second source density for the mid-frequency sources is lower than the first source density for the high-frequency sources.

Similarly, the low-frequency sources are also spread along the width W3 of the streamer spread 218, and in the example case the tow-width of the low-frequency sources is also Wm, but in other cases the tow width of the low-frequency sources is less than Wm. Moreover, the low-frequency sources define a third source density. In the example case, there are two low-frequency sources 304, and thus the source density may be the number of the low-frequency sources 306 with respect to the width W3. Given that the streamers 206 are also distributed about the width W3, an alternate indication of source density for the low-frequency sources may be the number of the low-frequency sources with respect to the number of sensor streamers 206, in this case resulting in a 2:20 (or, reduced, 1:10) source density for the low-frequency sources 304. As seen, for the example system the third source density for the low-frequency sources is lower than both the first and second source densities.

Distributing the seismic sources to be associated with some or all sensor streamers, and likewise dividing the seismic sources into high-frequency sources 302, mid-frequency sources 306, and low-frequency sources 308 addresses, at least in part, the issues noted above regarding CMP width and attenuation issues. With respect to attenuation of seismic energy, greater attenuation per unit distance of propagation is experienced by the higher frequency seismic energy. Thus, in the example system of FIGS. 2 and 3, the propagation distance for seismic energy originating from a high-frequency source 302 to an underground reflector and back to an associated sensor streamer 206 is shorter than for a seismic source centered in the streamer spread. Consider, as an example, the left outermost high-frequency source 302 and associated (in this case underlying) left outermost sensor streamer 206. Because the high-frequency source 302 resides directly above sensor streamer 206, the propagation distance for seismic energy has a shorter horizontal component (than, for example, seismic sources centered between the innermost sensor streamer). Moreover, the left outermost high frequency source 302 can be a high-frequency source for several sensor streamers 206 in the vicinity. For example, the left outermost high frequency source 302 can be a high-frequency source all the sensor streamers between the left outermost high-frequency source 302 and the sensor streamer beneath the left-most co-located high-, mid-, and low-frequency sources. In such a configuration the seismic energy still experiences less attenuation than a high-frequency seismic energy from a seismic source centered between the innermost sensor streamers.

For a variety of reasons, the mid-frequency sources 306 and low-frequency sources 308 may not be towed as wide as the high-frequency sources 302. Stated alternatively, the mid-frequency sources 306 and low-frequency sources 308 may be towed with lower source density than the high-frequency sources. One reason for not towing the mid- and low-frequency sources as wide as the high-frequency sources has to do with attenuation of seismic energy. Attenuation and signal level issues are not as pronounced at the outer sensor streamers for the mid- and low-frequency seismic energy, and thus there may not be as great a need to have mid- and low-frequency sources as widely towed with respect to attenuation issues. In place of, or in addition to, the attenuation aspects, another reason for not towing the mid- and low-frequency sources as wide as the high-frequency sources has to do with towing force for the mid- and low-frequency sources. As discussed in greater detail below, based on number source components and size, higher towing force may be used for the mid- and low-frequency sources than for the high-frequency sources, and higher towing force issues are compounded with larger towing widths. Moreover, there may be a resolution aspect as between the sources that provide a reason for different towing widths. In particular, the mid-frequency seismic energy has longer wavelength than the high-frequency seismic energy, and the low-frequency seismic energy has a longer wavelength than the high- and mid-frequency seismic energy. With longer wavelength comes lower resolution and wider energy spreading. The industry refers to the wavelength and resolution tradeoffs in terms of a "Fresnel zone" for a particular source with respect to a subsurface reflector, with higher-frequency sources having smaller Fresnel zones at the subsurface reflector, and lower-frequency sources having larger Fresnel zones at the subsurface reflector. These factors enable coarser source separation with decreasing frequency of the source, yet with wider effective towing. So, for example, the number, width, and spacing of high-frequency sources can be selected to provide overlapping, contiguous, or near contiguous coverage area of respective Fresnel zones in the cross-line direction. Likewise, the number, width, and spacing of mid-frequency sources can be selected to provide overlapping, contiguous, or near contiguous coverage area of respective Fresnel zones in the cross-line direction. Thus fewer mid-frequency sources, lower overall width, and greater spacing of mid-frequency sources may be used. Further still, the number, width, and spacing of low-frequency sources can be selected to provide overlapping, contiguous, or near contiguous coverage area of respective Fresnel zones in the cross-line direction. Thus fewer low-frequency sources, lower overall width, and greater spacing of low-frequency sources (including in some cases a single low-frequency source) may be used.

In the example case of FIG. 3, three mid-frequency sources 306 are used, comprising one mid-frequency source 306 centered in the streamer spread 218, and the remaining width on each side bifurcated by the respective two remaining mid-frequency sources 306. In the case of the low-frequency sources 308, again attenuation and/or towing force considerations may result in source density less than mid-frequency sources, and in the example case of FIG. 3, two low-frequency sources 308 are used, with the low frequency sources co-located with the non-centered mid-frequency sources 306.

Still referring to FIG. 3, the example system results in a wider CMP width than the situation of the seismic source centered between the innermost sensor streamers. Referring to the outer CMPs associated with the low-frequency sources only (so as not to unduly complicate the figure) for purposes of discussion. For the left-most low-frequency source 308 solid line 310 shows the path of travel of seismic energy released from the low-frequency source 308, reflected from the seismic reflector 300 at the CMP 312 and then incident on the left outmost sensor streamer 206. It is noted that solid line 310 also shows path of travel of seismic energy for the co-located mid-frequency source 306 and high-frequency source 30. Similarly for the right outermost sensor streamer 206, solid line 314 shows the path of travel of seismic energy released from the right-most low-frequency source 308 (as well as the co-located mid-frequency source 306 and high-frequency source 302), reflected from the seismic reflector 300 at the CMP 316, and then incident on the right outermost streamer 206. The CMPs 312 and 316 represent a width W4 wider than could be achieved with the seismic source centered between the innermost sensor streamers 206. In order to show that CMPs at the center of the streamer spread 218 are also covered, FIG. 3 shows dashed line 318 extending between the left-most low-frequency source 308 and a sensor streamer on the right side and defining a centered CMP 320. Before turning to a discussion of the various example types of high-, mid-, and low-frequency sources, it is noted that the layout of the high-, mid-, and low-frequency sources represented by FIG. 3 is merely an example, and many variations are possible. For example, fewer high-frequency sources 302 may be used (e.g., a high-frequency source 302 associated with every other sensor streamer, or every third sensor streamer if there is an odd number of sensor streamers). Similarly, greater or fewer mid-frequency sources could be used, and the horizontal placement of the mid- and low-frequency sources could be different than shown. In some cases, the number of mid-frequency sources could be the same as the low-frequency sources, and/or the mid- and low-frequency sources could be co-located. The specification now turns to a brief description of benders as seismic sources.

Figure 4:
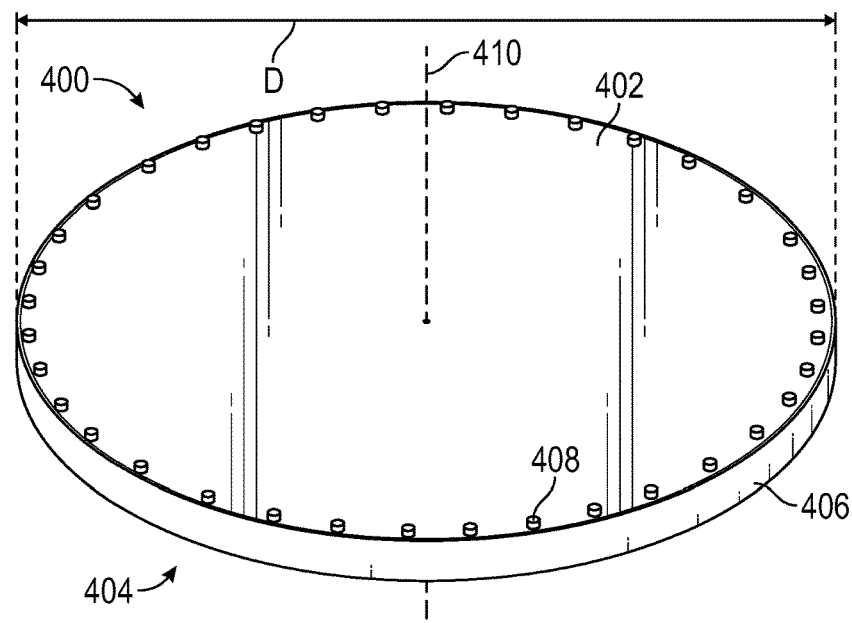
FIG. 4 shows a bender in accordance with at least some embodiments.

FIG. 4 shows a perspective view of a seismic source in the form of a bender 400. In particular, bender 400 has a top plate 402 and a corresponding bottom plate 404 (not visible in FIG. 4) separated by a hoop structure 406. Hoop structure 406 extends around the circumference of the plates 402/404 and provides separation between the plates 402/404. In the example system plates 402/404 are held in place against the hoop structure 406 by a plurality of fasteners 408. Referring to top plate 402 as representative of both plates 402/404, the top plate 402 defines a diameter D as well as a central axis 410. While the plates 402/404 are described as top and bottom, respectively, it will be understood that the designation is merely for convenience of the description, and in use as a seismic source, or part thereof, the plates may take any orientation with respect to local gravity.

Though not specifically shown in FIG. 4, the plates 402/404 and hoop structure 406 define an interior cavity that is sealed from the surrounding water when the bender 400 is in use. In some cases the interior cavity is filled with a volume of gas, and the pressure within the interior cavity may be controlled (e.g., to equalize to hydrostatic pressure at depth within the water). The bender 400 is designed and constructed such that the plates 402/404 flex inwardly toward each other (into the interior cavity, thus shrinking the volume of the interior cavity) and flex outward away from each other (away from the interior cavity, thus increasing the volume of the interior cavity), and in so doing displace water and thus create acoustic (i.e., seismic) energy in the surrounding water. The mechanisms by which the plates 402/404 are flexed inwardly and outwardly are many. For example, the plates 402/404 may be associated with piezoelectric materials that expand and contract as function of applied voltage. Alternately, an electrical, electromechanical, or reluctance-based system may be disposed within the interior cavity to mechanically force the plates 402/404 inwardly and outwardly. Further still, the pressure of the volume of gas within the interior cavity may be manipulated to cause flexing inwardly and outwardly of the plates 402/404.

Figure 5:
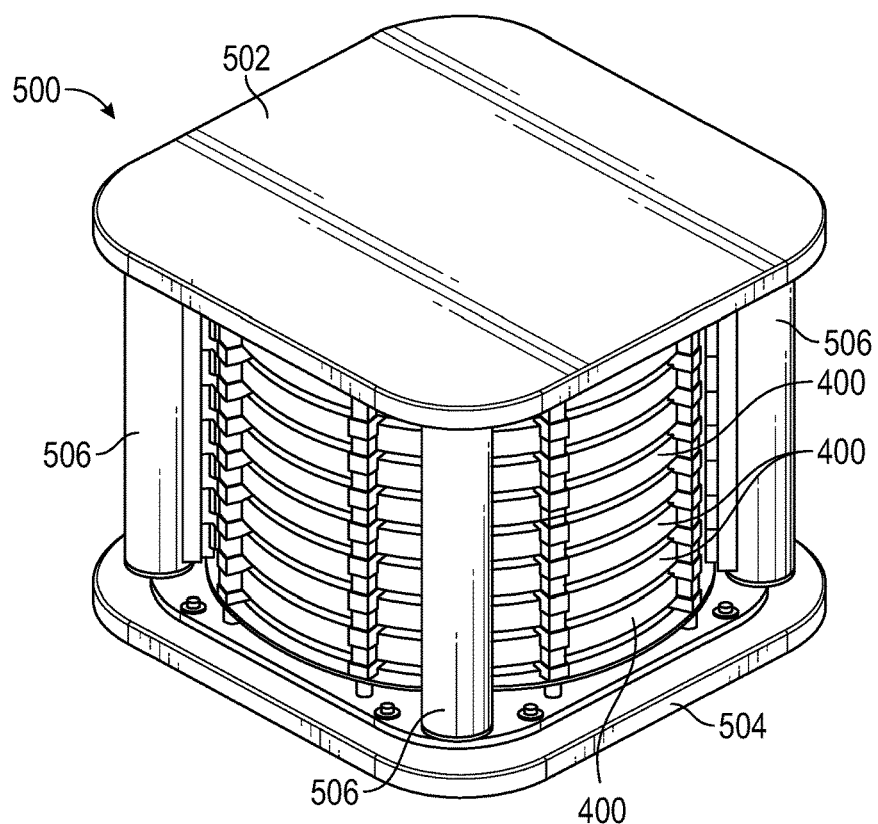
FIG. 5 shows an array of benders in accordance with at least some embodiments.

In some cases a single bender 400 may be sufficient to induce enough water displacement to achieve a sound pressure level suitable for performing a seismic survey; however, in most cases sound pressure level suitable for performing a seismic survey is from about 170 deciBells (dB) to about 220 dB regarding 1 micro-Pascal (pPa) at 1 meter distance from the seismic source. In order to achieve such a sound pressure level, in many cases multiple benders 400 may be stacked together such that the central axis 410 of each bender is coaxial with the central axis of other benders in the stack. FIG. 5 shows a perspective view of array of benders 500. In particular, the array 500 comprises a plurality of benders 400, with separation between the benders 400, held within a structure comprising a top member 502, bottom member 504, and interconnection members 506. In operation, each bender is driven concurrently such that the overall effect of the benders individually is cumulative (e.g., all plates of the benders simultaneously flexing outwardly relative to their respective interior cavities, and vice-versa) to induce enough water displacement to achieve a sound pressure level suitable for seismic surveys. In some cases, multiple arrays may be operated together to achieve the desired sound pressure level.

Figure 6:
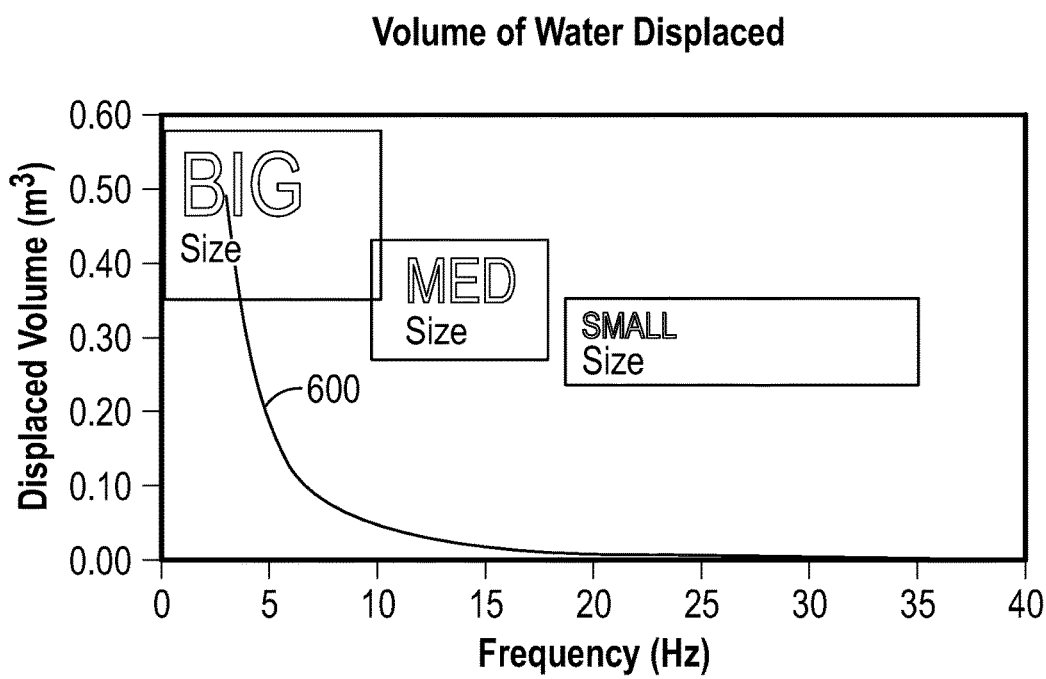
FIG. 6 shows a graph of water displacement as a function of frequency in accordance with at least some embodiments.

FIG. 6 shows a graph of volume of water displaced (y-axis on the left) in cubic meters against frequency of acoustic energy (x-axis along the bottom) in Hertz. In particular, line 600 within the graph shows a decaying exponential function (in the example, decays as the inverse square of the frequency) that indicates greater water volume displacement at the lower frequencies is used to achieve suitable sound pressure level, and lower water volume displacement at the higher frequencies is used to achieve suitable sound pressure levels. In the example systems the seismic sources are divided into high-, mid-, and low-frequency sources (but again greater or fewer divisions of frequency sources may be used). In order to achieve the sound pressure level suitable for seismic surveys within each division of frequency sources, the size (e.g., diameter) of the benders used for each seismic source, as well as the number of benders used, may be different. Overlaid on the chart of FIG. 6 are three boxes that conceptually convey an example relationship between size of the benders (e.g., diameter of each bender) and the frequency range for each division of seismic sources. For example, for the low-frequency sources (e.g., between 0 and about 6 Hz), larger diameter benders may be used. Moreover, for the low-frequency sources the quantity of benders in an array of benders used to create a low-frequency source (such as FIG. 5) may be greater than both the mid- and high-frequency sources. For the mid-frequency sources (e.g., between about 6 and about 20 Hz), smaller diameter benders may be used than for the low-frequency sources, and the diameters of the mid-frequency sources may be larger than the for the high-frequency sources. Moreover, for the mid-frequency sources the quantity of benders in an array of benders used to create a mid-frequency source (such as FIG. 5) may be higher than the high-frequency sources, but less than the low-frequency sources. Finally, for the high-frequency sources (e.g., above 20 Hz), smaller diameter benders may be used than for the low- and mid-frequency sources. Moreover, for the high-frequency sources the quantity of benders in an array of benders used to create a high-frequency source (such as FIG. 5) may be less than the low- and mid-frequency sources.

The size of the benders, the quantity of benders within an array, and the dynamic displacement of each bender affect the volume of water displaced, and thus there are multiple combinations of size, quantity, and displacement to achieve, within a division of frequencies, water volume displacement to achieve a sound pressure level suitable for seismic surveys. Nevertheless, in accordance with at least some embodiments each high-frequency source comprises a first quantity of benders (e.g., in an array such as shown in FIG. 5), where each bender in the first quantity has a first diameter (e.g., 20-30 centimeters). In the example embodiments, each mid-frequency source comprises a second quantity of benders (e.g., in an array such as shown in FIG. 5) greater than the first quantity, and where each bender in the second quantity has a second diameter greater than the first diameter. Further still in the example systems, each low-frequency source comprises a third quantity of benders (e.g., in an array such as shown in FIG. 5) greater than the first and second quantities, and where each bender in the third quantity has a third diameter (e.g., 0.9 meter or more) greater than the first and second diameters. Again, it will be understood that size of the benders is just one of the parameters that can be selected to achieve an effective bender area and therefore a desired sound pressure level, but the other parameters could be adjusted as well. For example, the low-frequency sources could have fewer benders than the high-frequency sources, yet have significantly greater bender dynamic displacement.

Summarizing the teaching of FIG. 6, more effective bender area is used in the lower divisions of frequency sources, and less effective bender area is used in the higher divisions of frequency sources, where the effective bender area is proportional to the product of the bender diameter, number of benders, and bender dynamic displacement. Thus, any one of the relevant factors (e.g., number, diameter, dynamic displacement) can be selected to achieve the desired result. Thus, in some cases: each high-frequency sources comprises a first effective bender area; each mid-frequency source comprises a second effective bender area greater than the first effective bender area; and each low frequency source comprises a third effective bender area greater than the first and second bender areas. As greater numbers of frequency divisions are used the effective bender area gets smaller in each successive increasing frequency division.

Because of the reduced size and lower quantity of benders associated with each high-frequency source, the high-frequency sources are easier to tow with greater width, whether in the example system of FIG. 2 or using other mechanisms, such as individual tow lines and doors for each high-frequency source or towing from the "super-wide" paravane tow lines 208A/B. Likewise, because of the somewhat larger size and greater quantity of benders associated with each mid- and low-frequency source, the mid- and low-frequency sources may not be towed as wide as the high-frequency sources, again whether in the example system of FIG. 2 or using other mechanisms, such as individual tow lines and doors for each mid- and low-frequency source or towing from the "super-wide" paravane tow lines 208A/B.

Figure 7:
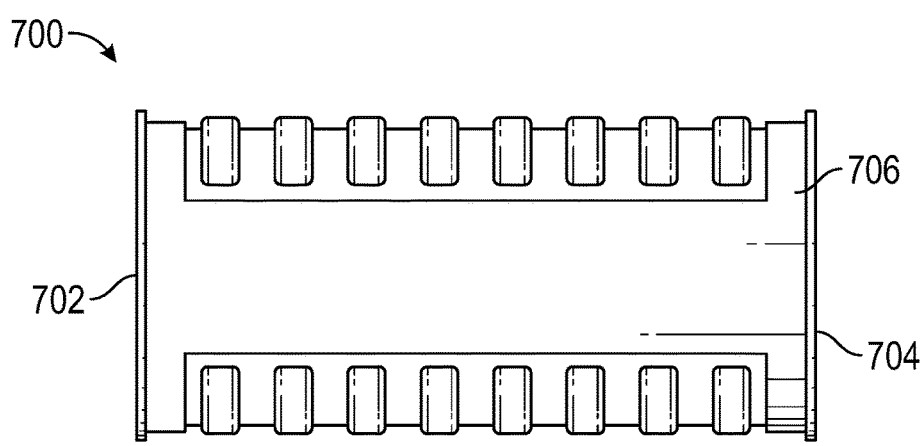
FIG. 7 shows a marine vibrator in accordance with at least some embodiments.

In yet still other embodiments the seismic sources may be implemented by way of one or more marine vibrators. FIG. 7 shows a side elevation view of an illustrative marine vibrator 700 in accordance with some example embodiments. In particular, the marine vibrator 700 comprises a first end 702 and second end 704. Between the two ends is a flexible region 706. The ends 702 and 704, and flexible region 706, define an interior volume (not visible in FIG. 7) within which resides a driving mechanism. The driving mechanism is coupled to the first end 702 and second end 704 such that the two ends can move inwardly toward each other (and thereby compressing the flexible region 706), and likewise the driving mechanism is configured such that the two ends can move outwardly away from each other (and thereby stretching the flexible region 706), and in so doing create acoustic energy. The driving mechanisms by which the ends 702 and 706 move inwardly and outwardly are many, such as electrical, electromechanical, or electrohydraulic-based systems disposed within the interior cavity. For most driving mechanisms, the precise relationship can be controlled such that signals can be encoded in the acoustic energy created. For example, a pure sine wave acoustic energy can be created, and when desired the additional information can be encoded, such as by way of phase modulation or frequency modulation of the base sine wave. Other types of marine vibrators may also be employed.

In some cases a single marine vibrator 700 may be sufficient to induce enough water displacement to achieve a sound pressure level suitable for performing a seismic survey; however, in other cases multiple marine vibrators are used. As mentioned above, the seismic sources are divided into high-, mid-, and low-frequency sources. In order to achieve the sound pressure level suitable for seismic surveys within each division of frequency sources, the size (e.g., length, width, and/or resting displacement) of the marine vibrators used for each seismic source, as well as the number of marine vibrators used, may be different. For example, for the low-frequency sources (e.g., between 0 and about 6 Hz), larger marine vibrators 700 may be used. Moreover, for the low-frequency sources the quantity of marine vibrators used to create a low-frequency source may be greater than both the mid- and high-frequency sources. For the mid-frequency sources (e.g., between about 6 and about 20 Hz), smaller size marine vibrators may be used than for the low-frequency sources, and the size of the mid-frequency sources may be larger than the for the high-frequency sources. Moreover, for the mid-frequency sources the quantity of marine vibrators may be fewer than the high-frequency sources, but more than the low-frequency sources. Finally, for the high-frequency sources (e.g., above 20 Hz), smaller marine vibrators may be used than for the low- and mid-frequency sources. Moreover, for the low-frequency sources the quantity of marine vibrators used to create a high-frequency source may be less than the low- and mid-frequency sources.

It will be understood that the size of the marine vibrators, the quantity of marine vibrators, and the dynamic displacement of the marine vibrators affect the volume of water displaced, and thus there are multiple combinations of size, quantity to achieve, and displacement, within a division of frequencies, to achieve a suitable a sound pressure level suitable for seismic surveys. Nevertheless, in accordance with at least some embodiments each high-frequency source comprises a first quantity of marine vibrators, where each marine vibrator has a first size. In the example embodiments, each mid-frequency source comprises a second quantity of marine vibrators greater than the first quantity, and where each marine vibrator has a second size greater than the first size. Further still in the example systems, each low-frequency source comprises a third quantity of marine vibrators greater than the first and second quantities, and where each marine vibrator in the third quantity has a size greater than the first and second size.

The specification now turns to operational aspects of example systems. In particular, the tow vessel 202 tows the seismic sources 220 (and in some cases the streamer spread 218) along the sail line 203 while the seismic sources 220 are activated. Activating the plurality of seismic sources 220 may take many forms. In one example operational method, all the seismic sources 220 are activated concurrently.

In other embodiments, all the sources 220 in a frequency band are active concurrently, and the activation as between the frequency bands may be rotated or cycled. For example, all the high frequency sources 302 may be activated concurrently, and then all the mid-frequency sources 306 may be activated concurrently, and then all the low-frequency sources 308 activated concurrently. Thereafter, the process may repeat. Relatedly, the sources of multiple frequency bands, but less than all the frequency bands, may be operated concurrently, with the identity of the operating frequency bands changed periodically.

In yet still other cases, the sources within a frequency-band may be conceptually divided into a plurality of groups. The sources within a group may be activated concurrently, and the operation as between the groups rotated or cycled, including concurrent operation of contiguous or non-contiguous groups.

Figure 8:
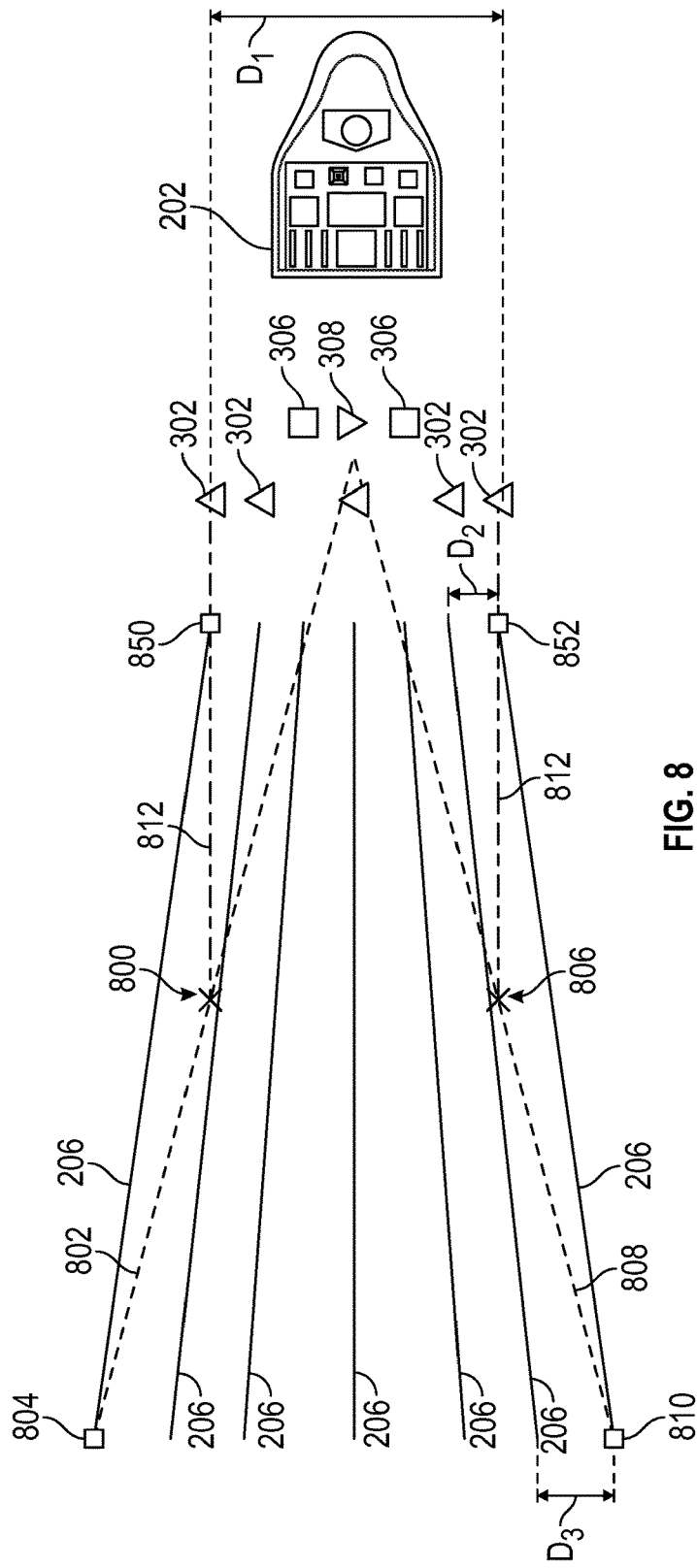
FIG. 8 shows a simplified overhead view a marine geophysical survey system in accordance with at least some embodiments.

The various embodiment discussed to this point have assumed that two or more low-frequency sources are towed off-center to increase the CMP width. However, in some cases, for a variety of operational reasons, towing multiple low-frequency sources may not be possible or plausible when towing the high- and mid-frequency sources spread out along the width the streamer spread. In such situations it is possible to nevertheless increase the effective CMP width with a center-towed low-frequency source by using a "fan tow" or "fan pattern" system. FIG. 8 shows an overhead view of a geophysical survey system in accordance with example "fan tow" embodiments. In particular, shown in FIG. 8 is the tow vessel 202 towing a plurality of sensor streamers 206, in this example situation seven such sensor streamers. The sensor streamers 206 define proximal width or distance D1, and corresponding distance D2 between the streamers, which distances are set and controlled by the towing equipment on the proximal end (e.g., spreader lines, paravanes, etc., not specifically shown so as not to unduly complicate the figure). However, in the example system the distance between streamers increases with increasing distance from the proximal end, resulting a distance D3 between the sensor streamers 206 at the distal ends, where D3 is greater than D2. The separations or distances may be maintained by steering devices spaced along the sensor streamers, sometimes referred to as "birds" or "steering birds," but the birds are shown so as not to unduly complicate the figure.

In the example system of FIG. 8, five high-frequency sources 302 are shown, along with two mid-frequency sources 306 and a single low-frequency source 308 towed directly behind the tow vessel 202. Any suitable towing system may be used to implement spreading the seismic sources along the width of the streamer spread, and likewise any of the above-noted seismic sources or source arrays may be used. The towing system is not shown, again so as not to unduly complicate the figure. For towing systems where the sensor streamers are effectively parallel from the proximal end to the distal end, the CMP width for the seismic survey with a centered low-frequency source would be about half the width of the streamer spread, at least for the low-frequency components. However, by towing the streamer spread such that the distances between the sensor streamers at the proximal ends are shorter than the distances between the sensor streamers at the distal ends (measured perpendicularly to the sail line or tow direction), then data for CMP points may reach wider than just half the width of the streamer spread for long offsets.

Still referring to FIG. 8, consider location 800, not as a location on the streamer spread that moves, but a location at a seismic or subsurface reflector such as the ocean bottom or a hydrocarbon bearing formation of interest. As the tow vessel 202 and sensor streamers in the example of FIG. 8 move across the page from left to right, location 800 remains at the same place on the page. As the proximal ends of the sensor streamers pass over the location 800 (the situation not specifically shown), the location 800 will be a CMP for particular high- and mid-frequency sources and corresponding sensors on the sensor streamers (though not necessarily at the same time (or for same location of the sources along their path of travel)). For example, sensor 850 at the proximal end of the outermost sensor streamer passes from left to right over the location 800 as the streamer spread moves, location 800 becomes a CMP for the outermost high-frequency source and sensor 850. Because in the example system the low-frequency source 308 is towed directly behind the tow vessel 202, when the proximal ends of the sensor streamers are over the location 800, likely the location 800 is not a CMP for any low-frequency source-to-sensor location. However, and as shown by FIG. 8, as the tow vessel 202 and streamer spread continue to move to the right, at some point the CMP location 800 becomes a CMP for the low-frequency source 308 in the center and a sensor 804 on the distal end of the outermost streamer 206 (the top-most streamer in the view of FIG. 8). Dashed lined 802 shows the correlation between the low-frequency source 308 and a sensor 804 at the distal end of the sensor streamer 206, with the location 800 being the mid-point along the line and thus the CMP for the particular sensor 804 and low-frequency source 308. A similar discussion is true for the location 806 on the opposite side, in relation the lowermost high-frequency source 302 and sensor 852, and likewise the discussion is true for the location 806, dashed line 808 and sensor 810 at the distal end of the outermost sensor streamer 206 (the bottom-most sensor streamer in the view of FIG. 8).

As seen, the locations 800 and 806 as CMPs are wider than half the width of the streamer spread at the proximal ends of the sensor streamers. In fact, as shown by the dash-dot-dash lines 812, the effective CMP width of locations 800 and 806 aligns with the with the width of the streamer spread at the proximal end, and aligns with the outermost high-frequency sources 302, all with the low-frequency source towed directly behind the tow vessel. It will be further understood that as the tow vessel 202 and the streamer spread continue to move to the right in the example view, for each activation of the low-frequency source 308 there will be a CMP point for the sensors 804 and 810 residing along the dash-dot-dash lines 812. In some cases, and as shown, the dash-dot-dash lines 812 aligns with CMP points for the example outermost high-frequency sources and the sensors 850 and 852 at the proximal ends of the sensor streamers 206, and the high frequency short offset CMPs and the low frequency far offset CMPs overlay or align. Thus, using the "fan tow" or "fan pattern" results in an effective CMP width approaching the width of the streamer spread in spite of a low-frequency source being towed directly behind the tow vessel 202.

Figure 9:
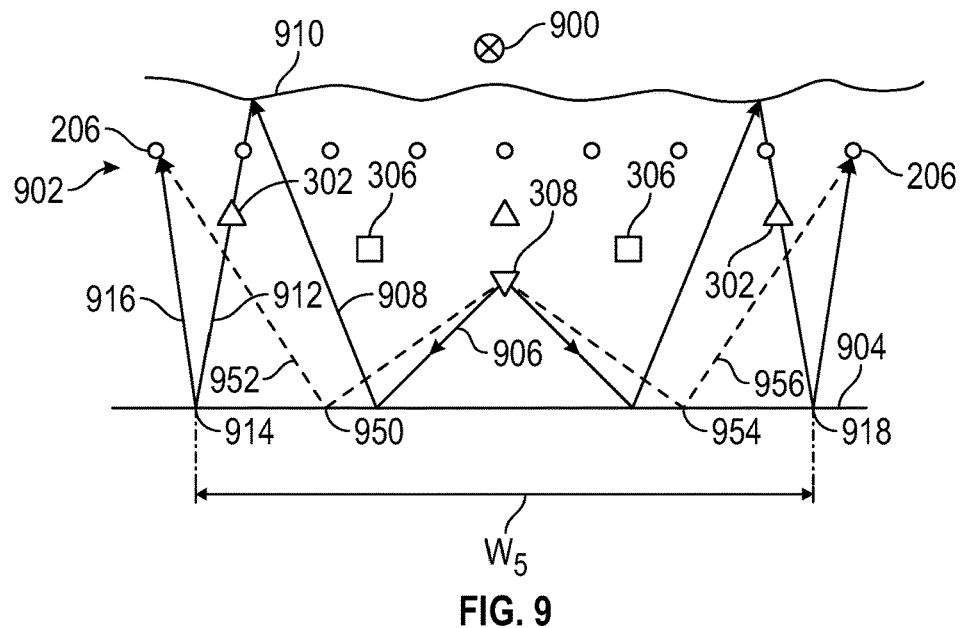
FIG. 9 shows an end elevation view of a marine geophysical survey system in accordance with at least some embodiments.

FIG. 9 shows a simplified elevation view of marine geophysical survey to highlight still further alternative systems and/or methods, with the view of FIG. 9 looking along a sail line 900 from behind the streamer spread 902. In particular, FIG. 9 shows the streamer spread 902 comprising nine sensor streamers 206 (only the outermost sensor streamers specifically numbered). Thus, FIG. 9 illustrates that the various techniques for dividing the seismic sources into high-, mid-, and low-frequency sources may be used with any plurality of sensor streamers, including fewer than 20 sensor streamers. A seismic reflector 904 is represented by a horizontal line, and the seismic reflector could be the ocean bottom or an underground formation. In accordance with example embodiments, the seismic sources are distributed across the width of the streamer spread 902. In addition, the seismic sources are divided into a plurality of high-frequency sources 302 (only the outermost high-frequency sources specifically numbered), a plurality of mid-frequency sources 306, and a single low-frequency source 308 centered in the streamer spread 902 (e.g., towed directly behind the tow vessel). FIG. 9 illustrates alternate systems where the seismic sources are towed below the sensor streamers 206, and further illustrates that the depth of each seismic source may be a function of the frequency range of the seismic source, with the high-frequency sources 302 towed more shallow than the mid-frequency sources 306, and the mid-frequency sources 306 towed more shallow than the low-frequency source(s) 308. Moreover, FIG. 9 shows an example where the density of the high-frequency sources 302 is less than 1:1 with respect to the sensor streamers.

FIG. 9 also shows that CMP width may be increased by utilizing the surface ghost reflections. For purposes of discussion, utilizing the surface ghost reflections is discussed with reference to the low-frequency seismic source, but surface ghost reflections may be used in the manner described for any seismic source. In the example system, for direct reflections of seismic energy between the centered low-frequency seismic source 308 and the left outermost sensor streamer 206, an example CMP 950 is is shown by line dashed 952. Likewise for the right outermost sensor streamer 206, an example CMP 954 is is shown by line dashed 956. The two CMP points 950 and 954 define a certain width (measured perpendicularly to the sail line 900), though the width is not specifically delineated in FIG. 9.

Now consider that solid lines 906 and 908 represent seismic energy created by activation of the low-frequency source 308. The downward traveling seismic energy represented by line 906 reflects from the seismic reflector 904 to become upward travelling seismic energy represented by line 908. The upward travelling seismic energy reflects from the surface 910 of the water to become a downward travelling seismic energy represented by line 912 (sometimes referred to as a "surface ghost reflection" or just "surface ghost"). As shown by line 912, the surface ghost in this instance intersects with the location of a sensor streamer (and thus the sensors therein) and can be read such that the amplitude and arrival time at the sensor streamer are known or knowable. The surface ghost 912 continues downward, reflects again at the location 914, and then is incident upon the outermost sensor streamer 206. A similar bounce-path pattern for seismic energy on the right side the example system also occurs, with the final reflection of interest taking place at location 918. In accordance with alternative embodiments, given that much information is known or knowable with respect to the surface ghosts, such surface ghosts can be considered seismic sources (pseudo-source) at the locations of the sensor streamers where the downward travelling surface ghosts intersect the sensor streamers. Thus, the locations 914 and 916 can be considered, for purposes of later data processing, CMP locations with respect to the outermost sensor streamers 206 which outermost sensor streamers are more distance from the seismic source of interests (in this example the low-frequency source). It follows than that the effective CMP width W5 can be achieved, where W5 is greater than half the width of the streamer spread 902, and greater than the width of CMP points 950 and 954, all with an example centered low-frequency source. The techniques of FIG. 9 of using surface ghosts as effective seismic sources may be used in situations where the sensor streamers of the streamer spread 902 are parallel along an entire length of the streamer spread, or in the "fan tow" or "fan pattern" situations discussed with the respect to FIG. 8.

Still referring to FIG. 9, note also the location of the left outermost high-frequency source 302 and right outermost high-frequency source 302. With a properly planned spacing between the sources and spacing between the streamers, the CMP 914 and 918 for the surface ghost pseudo-source signals corresponds to the CMPs for the outermost high-frequency sources 302. While FIG. 9 shows the surface ghost lines passing directly through the outermost high-frequency sources, given the Fresnel zone ideas discussed above, so long as the Fresnel zones as between the outmost high-frequency sources at least partially overlap with the Fresnel zone associated with the surface ghost pseudo-source, the correspondence will be sufficient for later data processing. It follows that as the streamer spread and sources are towed along the sail line, the CMPs become corresponding CMP lines.

Figure 10:
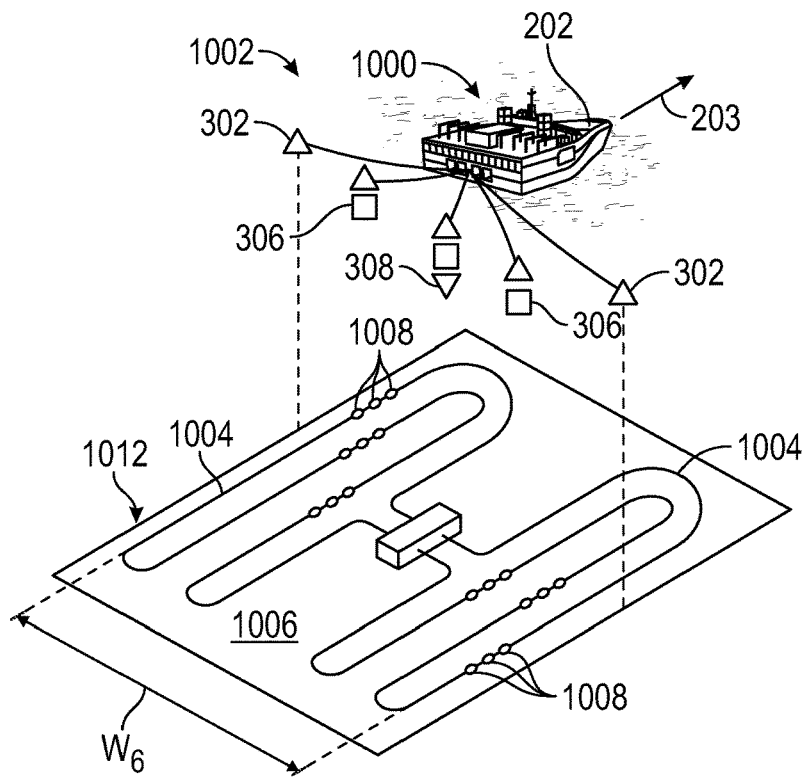
FIG. 10 shows a perspective cut-away view of a marine geophysical survey system in accordance with at least some embodiments.

The various embodiments discussed to this point have been with respect to a streamer spread towed along with the various seismic sources. However, the example embodiments of towing the high-, mid-, and low-frequency sources with varying source densities (and by extension varying overall widths) is equally applicable to surveys associated with permanent reservoir monitoring (again PRM) systems. FIG. 10 shows a perspective cut-away view of a system in accordance with alternate embodiments. In particular, FIG. 10 shows a tow vessel 202 at the surface 1000 of the water towing plurality of seismic sources 1002 beneath the surface 1000, and the towing along a sail line 203. In the example system each member of the set of seismic sources is shown as directly towed by the tow vessel, but any suitable system for towing the seismic sources 1002 may be used (including paravanes, paravane tow lines, spreader lines as discussed with respect to FIG. 2). Moreover, similar to the previous embodiments the seismic sources are divided into high-frequency sources 302 (only the outermost labeled, and shown as upward facing triangles), mid-frequency sources 306 (only outermost labeled, and shown as squares), and a centered-towed low-frequency source 308 (shown as a downward facing triangle). The number and spacing of the example seismic sources 1002 is merely illustrative, and greater number of sources may be used (particularly the low-frequency sources), and fewer number of sources may be used, as the situation dictates.

FIG. 10 also shows that in the example system the array of sensors is in the form of sensor cables 1004 installed on the seabed rather than being towed along with the seismic sources 1002. In some cases, the sensor cables 1004 and the sensor streamers 206 (FIG. 2) have identical or near identical structure. Thus, FIG. 2 represents a PRM situation where the sensor cables are installed on the seabed and remain in place for an extended period of time. It is noted that the sensor cables 1004 can be removed (usually after several years), and thus the "permanent" term in "permanent reservoir monitoring" is meant only to distinguish from towed sensor streamers, and not to imply a definite time frame that the sensor cables must remain on the seabed.

Each sensor cable 1004 comprises a plurality of sensors 1008 spread along the length of the cable. Only a handful of the sensors 1008 are shown in FIG. 10 (and not all shown are numbered) so as not to unduly complicate the figure, but in practice the sensors 1008 extend along a substantial length of the sensor cables thus forming an array of sensors 1012. Regardless of being in a PRM installation, the array of sensors defines a width W6 measured along the sail line 203. The sensors 1008 may be communicatively coupled to a central connection system 1010, which communicatively couples the sensor cables 1004 to recording equipment, such as on another floating vessel (not shown) or coupled by way of additional cables to recording equipment onshore (again, not specifically shown). With respect the seismic sources 302, 306, and 308, all the various placement, spacing, and density issues discussed with respect to the towed sensor streamers are equally applicable to the situation of FIG. 10 with the understanding that the CMPs are defined between the stationary sensors and moving seismic sources. One of ordinary skill in the art, with the benefit of this disclosure and now understanding the embodiments associated with the sensor streamers, could apply the frequency-based divisions of the seismic sources to the PRM situation. For example, in FIG. 3 in the PRM situation the sensor streamers 206 would reside on the seabed (and thus define the seabed in the drawing), and yet the various widths described with the respect to the seismic reflector 300 would be equally valid. FIG. 9 shows the sources below the sensor streamers 206, but if the sources in FIG. 9 were above the sensors installed on the seabed in a PRM-type system, again the technique of measuring a downwardly travelling surface ghost at one sensor or sensor cable and using the surface ghost as a pseudo-source for a sensor or sensor cable at a greater width is equally applicable. In other embodiment, sea bottom nodes may be used in lieu of or in addition to the cables 1004.

Figure 11:
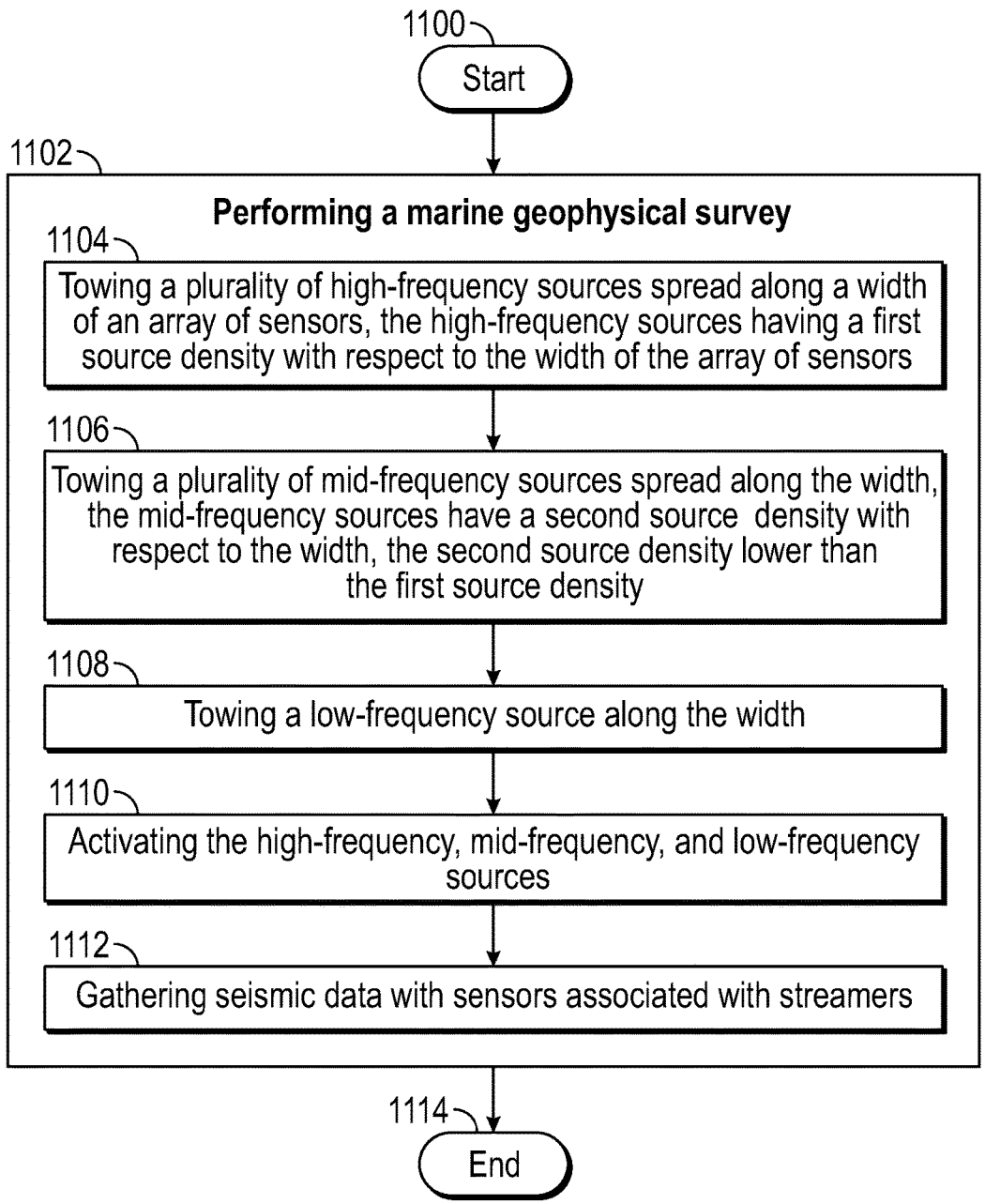
FIG. 11 shows a method in accordance with at least some embodiments.

FIG. 11 shows a method in accordance with at least some embodiments. In particular, the method starts (block 1100) and comprises performing a marine geophysical survey (block 1102). Performing the marine geophysical survey may comprise: towing a plurality of high-frequency sources spread along a width of an array of sensors, the high-frequency sources having a first source density with respect to the width (block 1104); towing a plurality of mid-frequency sources spread along the width, the mid-frequency sources have a second source density with respect to the width, the second source density lower than the first source density (block 1106); towing a low-frequency source along the width (block 1108); activating the high-frequency, mid-frequency, and low-frequency sources (block 1110); and gathering seismic data with sensors of the array of sensors (block 1112). Thereafter the method ends (block 1014) in many cases to be repeated as a tow vessel travels along a surface of the body of water.

In accordance with a number of embodiments of the present disclosure, a geophysical data product may be produced. The geophysical data product may include, for example, data collected in situations where the seismic sources are spread out across the proximal or distal end of an array of sensors as discussed in this specification. Geophysical data, such as data previously collected by sensors, may be obtained (e.g., retrieved from a data library) and may be stored on a non-transitory, tangible computer-readable medium. The geophysical data product may also be produced by processing the gathered geophysical data offshore (i.e., by equipment on a vessel) or onshore (i.e., at a facility on land).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
    performing a marine geophysical survey by:
        towing a plurality of high-frequency sources spread along a width of an array of sensors, the high-frequency sources having a first source density with respect to the width of the array of sensors; and simultaneously
        towing a plurality of mid-frequency sources spread along the width of the array of sensors, the mid-frequency sources have a second source density with respect to the width of the array of sensors, the second source density lower than the first source density; and simultaneously
        towing a low-frequency source along the width of the array of sensors; and
        activating the high-frequency, mid-frequency, and low-frequency sources.

2. The method of claim 1 further comprising towing a streamer spread comprising the array of sensors by the tow vessel while towing the plurality of high-frequency sources, the plurality of mid-frequency sources, and the low-frequency source.

3. The method of claim 2:
    wherein towing the plurality of high-frequency sources further comprises towing such that a source-receiver relationship for a sensor at a proximal end of the streamer spread and an outermost high-frequency source creates a first common midpoint (CMP) line; and
    wherein towing the low-frequency source further comprises towing such that a source-receiver relationship for a sensor at a distal end of the streamer spread and the low-frequency source creates a second CMP line that overlays the first CMP line.

4. The method of claim 2 further comprising:
    measuring a surface ghost reflection associated with a seismic source, the measuring at a first sensor of a first sensor streamer of the streamer spread;
    utilizing the surface ghost reflection as a pseudo-source at the location of the first sensor;
    measuring the surface ghost reflection at a second sensor of a second sensor streamer of the streamer spread, the second sensor streamer spaced more distant from the low-frequency source than the first sensor streamer measured perpendicularly to the sail line, and the measuring of the surface ghost reflection after reflection at a common midpoint (CMP) between the first sensor streamer and the second sensor streamer.

5. The method of claim 4 wherein the CMP is wider than a CMP between the seismic source and the second sensor streamer.

6. The method of claim 4 wherein the CMP corresponds to a CMP between a second seismic source and the second sensor streamer.

7. The method of claim 1 wherein each towing step further comprises simultaneously towing over an array of sensors residing on the seabed.

8. The method of claim 1:
    wherein towing the plurality of high-frequency sources further comprises towing such that Fresnel zones of the plurality of high-frequency sources at a subsurface reflector are substantially contiguous along at least a portion of the width of the array of sensors;
    wherein towing the plurality of mid-frequency sources further comprises towing such that Fresnel zones of the plurality of mid-frequency sources at the subsurface reflector are substantially contiguous along at least the portion of the width; and
    wherein towing the low-frequency source further comprises towing such that Fresnel zone of the low-frequency source at the subsurface reflector is substantially contiguous along at least the portion of the width.

9. The method of claim 1 wherein towing the plurality of high-frequency sources further comprises towing such that each high-frequency source comprises at least one selected from the group consisting of: a bender; an array of benders; a marine vibrator; and an array of marine vibrators.

10. The method of claim 1 wherein towing the plurality of mid-frequency sources further comprises towing such that each high-frequency source comprises at least one selected from the group consisting of: a bender; an array of benders; a marine vibrator; and an array of marine vibrators.

11. The method of claim 1 wherein towing the low-frequency source further comprises towing at least one selected from the group consisting of: an array of benders; and an array of marine vibrators.

12. The method of claim 1:
wherein towing the plurality of high-frequency sources further comprises towing such that each high-frequency source comprises a first effective bender area;
wherein towing the plurality of mid-frequency sources further comprises towing such that each mid-frequency source comprises a second effective bender area greater than the first effective bender area; and
wherein towing the low-frequency source further comprises towing a source having a third effective bender area greater than the first and second bender areas.

13. The method of claim 1:
wherein towing the plurality of high-frequency sources further comprises towing such that Fresnel zones of the plurality of high-frequency sources at a subsurface reflector are substantially contiguous along at least a portion of the width of the array of sensors;
wherein towing the plurality of mid-frequency sources further comprises towing such that Fresnel zones of the plurality of mid-frequency sources at the subsurface reflector are substantially contiguous along at least the portion of the width; and
wherein towing the low-frequency source further comprises towing such that Fresnel zone of the low-frequency source at the subsurface reflector is substantially contiguous along at least the portion of the width.

14. The method of claim 1 wherein towing the low-frequency source further comprises towing a plurality of low frequency sources along the width of the array of sensors, the low-frequency sources having a third source density with respect to the width of the array of sensors, and the third source density lower than the first and second source density.

15. The method of claim 2 further comprising towing the steamer spread in a fan pattern such that first distances between streamers at a proximal end of the streamer spread are smaller than second distances between streamers at a distal end of the streamer spread, the first and second distances measured perpendicularly to a direction of tow of the streamer spread.

16. The method of claim 1 wherein activating further comprises at least one selected from the group consisting of: activating the high-frequency, mid-frequency, and low-frequency sources concurrently; rotating activation as between frequency bands, with all sources within each frequency band activated concurrently; rotating activation as between groups of less than all sources within each frequency band, and all sources within each group activated concurrently; and combinations thereof.

17. A system comprising:
a tow vessel floating at the surface of a body of water;
a plurality of high-frequency sources spread along a width measured perpendicularly to a sail line of the tow vessel, the plurality of high-frequency coupled to the tow vessel by a first plurality of tow cables, the high-frequency sources define a first source density with respect to the width;
a plurality of mid-frequency sources spread along the width and coupled to the tow vessel by a second plurality of tow cables, the mid-frequency sources define a second source density with respect to the width, the second source density lower than the first source density; and
a low-frequency source positioned along the width of a streamer spread and coupled to the tow vessel by a tow cable.

18. The system of claim 17 further comprising:
onboard data acquisition system disposed on the tow vessel; and
a streamer spread comprising a plurality of sensor streamers coupled to the tow vessel by a plurality of lead-in cables, each sensor steamer defines a proximal end and a distal end, each sensor streamer extends behind the tow vessel, the streamer spread defines the width, and the streamer spread submerged in the body of water.

19. The system of claim 18 further comprising the steamer spread in a fan pattern such that first distances between sensor streamers at a proximal end of the streamer spread are smaller than second distances between sensor streamers at a distal end of the streamer spread, the first and second distances measured perpendicularly to a tow line of the streamer spread.

20. The system of claim 17 further comprising an array of sensors disposed on a seabed, the array of sensors defines the width.

21. The system of claim 17 further comprising a plurality of low-frequency sources spread along the width and coupled to the tow vessel by a third plurality of tow cables, the low-frequency sources define a third source density with respect to the width, the third source density lower than the first and second source densities.

22. The system of claim 21 wherein at least some of the plurality of low-frequency sources further comprise at least one selected from the group consisting of: a bender; an array of benders; a marine vibrator; and an array of marine vibrators.

23. The system of claim 17 wherein at least some of the plurality of high-frequency sources further comprise at least one selected from the group consisting of: a bender; an array of benders; a marine vibrator; and an array of marine vibrators.

24. The system of claim 17 wherein at least some of the plurality of mid-frequency sources further comprise at least one selected from the group consisting of: a bender; an array of benders; a marine vibrator; and an array of marine vibrators.

25. The system of claim 17 wherein the low-frequency source further comprises at least one selected from the group consisting of: an array of benders; and an array of marine vibrators.

26. The system of claim 17:
said plurality of high-frequency sources further comprises each high-frequency source comprises a first effective bender area;
said plurality of mid-frequency sources further comprises each mid-frequency source comprises a second effective bender area greater than the first effective bender area; and
said low-frequency source further comprises a third effective bender area greater than the first and second effective bender areas.

27. A method of manufacturing a geophysical data product, the method comprising:
obtaining geophysical data by a sensor streamer spread associated with high-frequency sources having a first source density, mid-frequency sources having a second source density lower than the first source density, and at least one low-frequency source having a third source density lower than the first and second densities; and recording the geophysical data on a tangible computer-readable medium.

\* \* \* \* \*